(12) United States Patent
Coppola et al.

(10) Patent No.: US 9,427,061 B2
(45) Date of Patent: Aug. 30, 2016

(54) FLEXIBLE ARTIFICIAL NAILS AND METHOD OF FORMING SAME

(71) Applicant: Pacific World Corporation, Lake Forest, CA (US)

(72) Inventors: Jeanine Coppola, Irvine, CA (US); Marcelo Foglia, Lake Forest, CA (US)

(73) Assignee: PACIFIC WORLD CORPORATION, Lake Forest, CA (US)

( * ) Notice: Subject to any disclaimer, the term of this patent is extended or adjusted under 35 U.S.C. 154(b) by 369 days.

(21) Appl. No.: 13/920,869

(22) Filed: Jun. 18, 2013

(65) Prior Publication Data

US 2014/0159279 A1    Jun. 12, 2014

Related U.S. Application Data

(62) Division of application No. 13/056,554, filed as application No. PCT/US2009/052463 on Jul. 31, 2009, now Pat. No. 8,539,960.

(60) Provisional application No. 61/085,635, filed on Aug. 1, 2008.

(51) Int. Cl.
| | |
|---|---|
| *A45D 29/00* | (2006.01) |
| *A45D 31/00* | (2006.01) |
| *B29C 45/16* | (2006.01) |
| *B29C 70/78* | (2006.01) |

(52) U.S. Cl.
CPC ........... *A45D 31/00* (2013.01); *B29C 45/1675* (2013.01); *B29C 70/78* (2013.01)

(58) Field of Classification Search
CPC .... A45D 31/00; B29C 70/78; B29C 45/1675
See application file for complete search history.

(56) References Cited

U.S. PATENT DOCUMENTS

| | | | |
|---|---|---|---|
| 2,239,040 | A | 4/1941 | Holmes |
| D136,030 | S | 7/1943 | Belmonte et al. |
| 2,417,677 | A | 3/1947 | Cohan |
| 2,941,535 | A | 6/1960 | Lappe |
| 3,157,912 | A | 11/1964 | Lisczawka |
| 3,552,401 | A | 1/1971 | Michaelson et al. |
| 3,578,158 | A | 5/1971 | Aylott |

(Continued)

FOREIGN PATENT DOCUMENTS

| | | |
|---|---|---|
| EP | 0167329 A2 | 1/1986 |
| EP | 1415567 A1 | 5/2004 |

(Continued)

OTHER PUBLICATIONS

Broadway Nails, "Fast French Nail Kit," Retail product packaging purchased on Mar. 26, 2009.

*Primary Examiner* — Galen Hauth
(74) *Attorney, Agent, or Firm* — McGuireWoods LLP

(57) ABSTRACT

A preformed artificial nail, a nail kit including such a nail, and a method of forming such a nail, the nail including a nail bed portion formed of a first material and a free edge portion having an upper portion formed of the first material and lower portion formed of a second material disposed subjacent the first material, the free edge portion being adjacent to and distal the nail bed portion, and the first material being comparatively more flexible than the second material. The lower portion of the free edge portion may include a generally uniform thickness or a varied thickness such as a wedge shape, thickening toward the distal edge of the artificial nail.

7 Claims, 2 Drawing Sheets

(56) References Cited

U.S. PATENT DOCUMENTS

| | | |
|---|---|---|
| 3,722,104 A | 3/1973 | Enzetti |
| 3,982,551 A | 9/1976 | Bartolucci |
| 3,993,084 A | 11/1976 | Cullen |
| 4,007,748 A | 2/1977 | Matranga et al. |
| 4,106,614 A | 8/1978 | Aylott |
| 4,346,720 A | 8/1982 | Hokama |
| 4,479,672 A | 10/1984 | Jermyn |
| 4,554,935 A | 11/1985 | Hokama |
| D285,367 S | 8/1986 | Lindner |
| 4,625,740 A | 12/1986 | Roth |
| 4,648,416 A | 3/1987 | Kilman et al. |
| 4,718,957 A | 1/1988 | Sensenbrenner |
| 4,751,935 A | 6/1988 | Mast et al. |
| 4,765,350 A | 8/1988 | Moore |
| 4,805,645 A | 2/1989 | Schiff et al. |
| D309,196 S | 7/1990 | LaJoie |
| 5,005,595 A | 4/1991 | Aylott |
| 5,060,678 A | 10/1991 | Bauman et al. |
| 5,070,892 A | 12/1991 | Trematerra |
| 5,209,250 A | 5/1993 | Taeckens |
| 5,450,864 A | 9/1995 | LaJoie et al. |
| 5,513,664 A | 5/1996 | Krupsky |
| D376,224 S | 12/1996 | Fojon |
| 5,676,165 A | 10/1997 | Bannett |
| D386,823 S | 11/1997 | Carroll et al. |
| 5,699,813 A | 12/1997 | Carroll |
| 5,791,482 A | 8/1998 | Murphy et al. |
| 5,816,408 A | 10/1998 | Indelicato |
| 5,832,936 A | 11/1998 | Pruchnic et al. |
| 5,860,429 A | 1/1999 | Chang |
| 5,901,714 A | 5/1999 | Benkart |
| 5,904,149 A | 5/1999 | Ruhl et al. |
| 5,908,035 A | 6/1999 | Carroll et al. |
| 5,913,556 A | 6/1999 | Perusse |
| 5,944,027 A * | 8/1999 | Chang .................... 132/200 |
| D433,536 S | 11/2000 | Schwartz |
| 6,196,234 B1 | 3/2001 | Gifford |
| D441,134 S | 4/2001 | Manzione |
| 6,220,250 B1 | 4/2001 | Park |
| 6,328,039 B1 | 12/2001 | Chang |
| 6,354,304 B1 | 3/2002 | Chang |
| D455,866 S | 4/2002 | Baltierra |
| 6,892,736 B2 | 5/2005 | Chang et al. |
| D525,747 S | 7/2006 | Robinson |
| 7,100,619 B2 | 9/2006 | Kim |
| 7,150,281 B2 | 12/2006 | Han |
| 7,185,660 B1 | 3/2007 | Han |
| 7,337,783 B2 | 3/2008 | Han |
| 7,389,876 B2 | 6/2008 | Hong et al. |
| 7,677,257 B2 | 3/2010 | Han |
| 7,997,283 B2 | 8/2011 | Fracassi et al. |
| 8,132,568 B2 | 3/2012 | Fracassi et al. |
| 2002/0002980 A1 | 1/2002 | Chang et al. |
| 2002/0023656 A1 | 2/2002 | Chang |
| 2002/0185144 A1 | 12/2002 | Chang et al. |
| 2003/0178040 A1 | 9/2003 | Swensen |
| 2003/0209250 A1 | 11/2003 | Chang |
| 2004/0079381 A1 | 4/2004 | Han |
| 2004/0112397 A1 | 6/2004 | Riester |
| 2004/0173232 A1 | 9/2004 | Chang et al. |
| 2004/0216757 A1 | 11/2004 | Chang |
| 2005/0121048 A1 | 6/2005 | Han |
| 2005/0183735 A1 | 8/2005 | Robinson |
| 2005/0217686 A1 | 10/2005 | Lee |
| 2005/0268931 A1 | 12/2005 | Chang |
| 2006/0191551 A1 | 8/2006 | Han |
| 2006/0237027 A1 * | 10/2006 | Han .............................. 132/200 |
| 2007/0051384 A1 * | 3/2007 | Fracassi et al. ................. 132/73 |
| 2007/0107745 A1 | 5/2007 | Kiyomoto |
| 2007/0224288 A1 | 9/2007 | Kim |
| 2007/0277841 A1 | 12/2007 | Kim |
| 2008/0017211 A1 | 1/2008 | Han |
| 2008/0017212 A1 | 1/2008 | Han |
| 2008/0017213 A1 | 1/2008 | Han |
| 2008/0017214 A1 | 1/2008 | Han |
| 2008/0099037 A1 | 5/2008 | Chang |
| 2008/0251092 A1 | 10/2008 | Han |
| 2008/0283076 A1 | 11/2008 | Fracassi et al. |
| 2011/0030711 A1 | 2/2011 | Han |
| 2011/0155946 A1 | 6/2011 | Simpson |
| 2011/0197904 A1 | 8/2011 | Coppola et al. |

FOREIGN PATENT DOCUMENTS

| | | |
|---|---|---|
| EP | 1902644 A2 | 3/2008 |
| EP | 1902645 A1 | 3/2008 |
| EP | 1920675 A1 | 5/2008 |
| FR | 2534120 A1 | 10/1982 |
| GB | 752960 | 7/1954 |
| GB | 725969 | 3/1955 |
| JP | 2002-034641 A | 2/2002 |
| JP | 2004-081843 A | 3/2004 |
| JP | 2006-181349 A | 7/2006 |
| KR | 2002-0008283 A | 1/2002 |
| KR | 20-0327518-0000 Y | 9/2003 |
| KR | 2004-0059956 A | 7/2004 |
| KR | 2005-0079081 A | 8/2005 |
| KR | 10-0605671 B1 | 8/2006 |
| KR | 10-0659692 B1 | 12/2006 |
| KR | 10-0737424 B1 | 7/2007 |
| KR | 10-0765332 B1 | 10/2007 |
| KR | 20-0438231 Y1 | 2/2008 |
| KR | 10-0849119 B | 7/2008 |
| WO | WO 02/00057 A2 | 1/2002 |
| WO | WO 2006/062963 A1 | 6/2006 |
| WO | WO 2008/111759 A1 | 9/2008 |

* cited by examiner

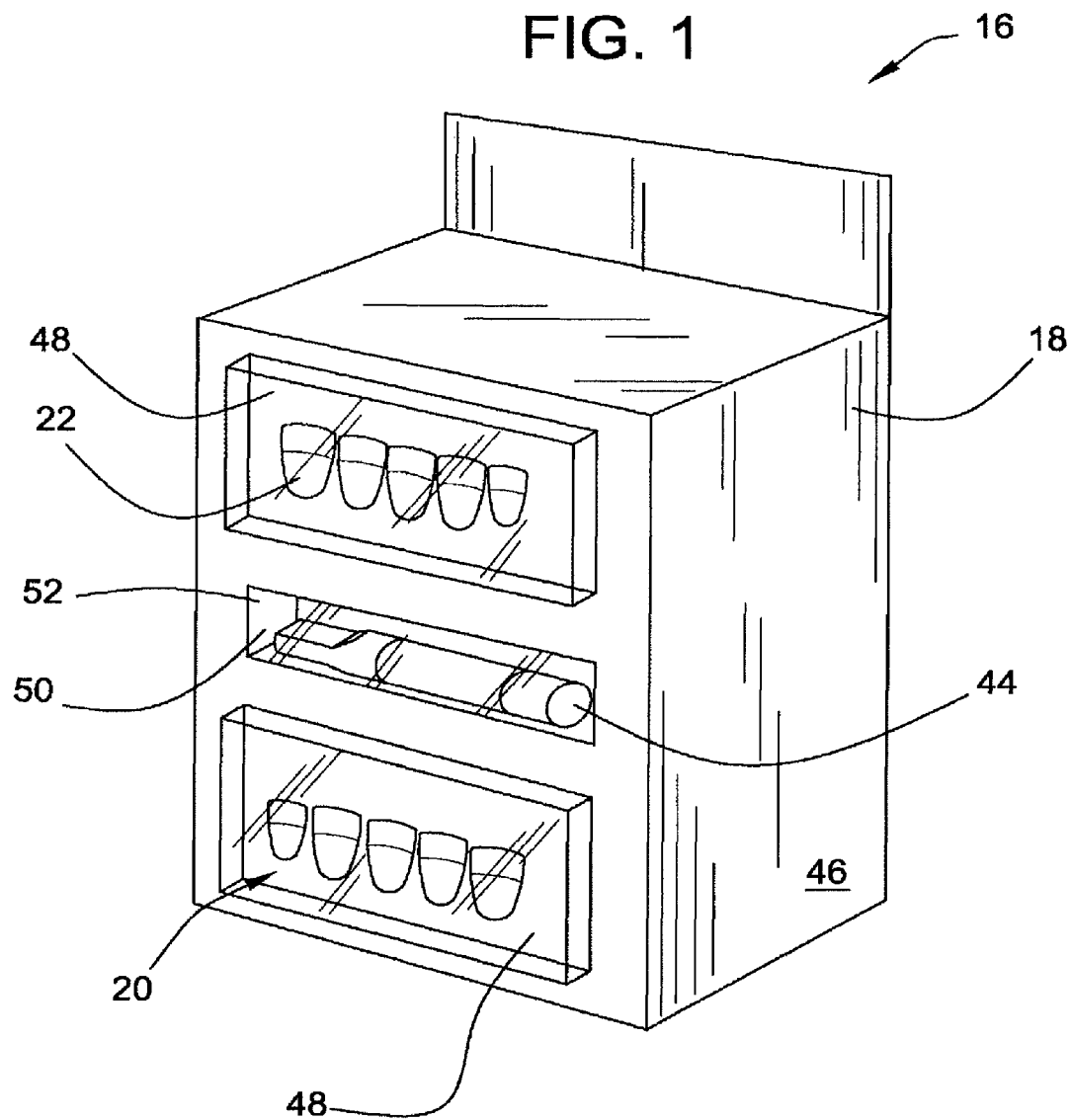

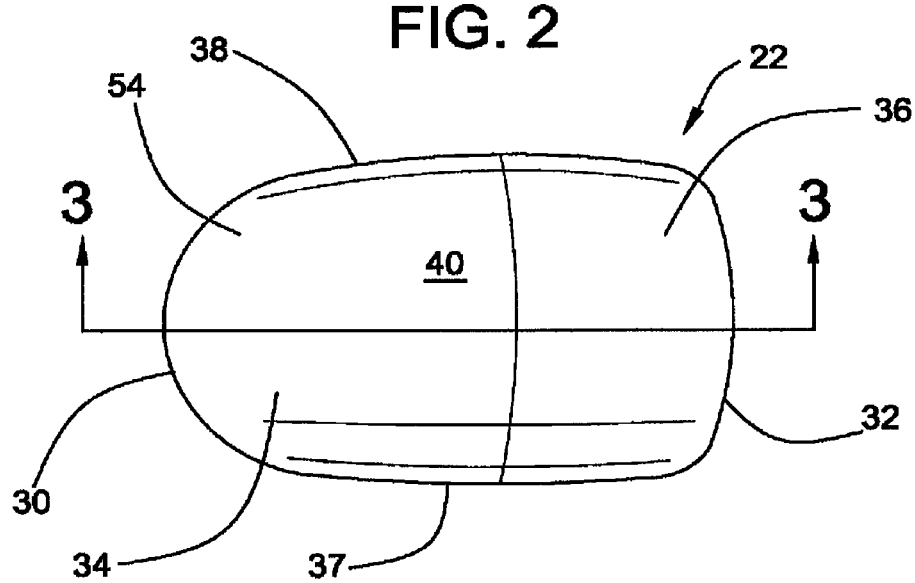
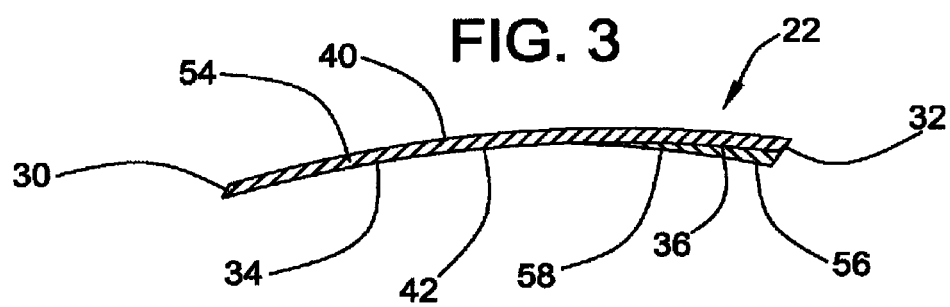
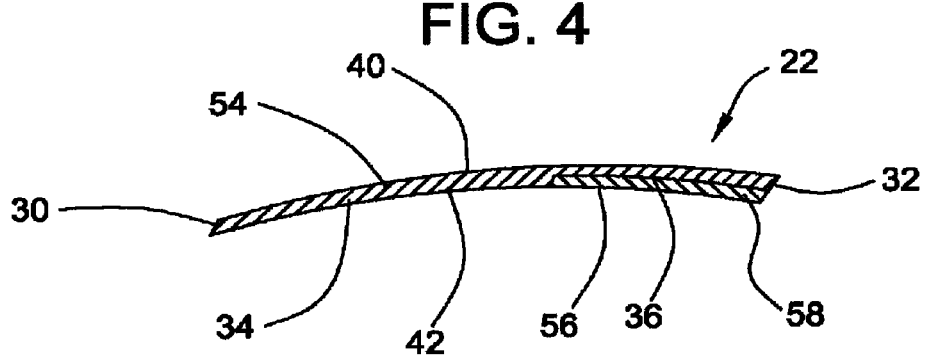

FLEXIBLE ARTIFICIAL NAILS AND METHOD OF FORMING SAME

RELATED APPLICATIONS

This application is a divisional application of U.S. application Ser. No. 13/056,554, filed Apr. 22, 2011, which is a national stage application (under 35 U.S.C. §371) of PCT/US2009/052463, filed Jul. 31, 2009, which claims the benefit of U.S. Provisional Application No. 61/085,635, filed on Aug. 1, 2008.

FIELD OF THE INVENTION

This invention pertains generally to human fingernail decorations, and more particularly to artificial nails that are intended to be adhered to a human's natural fingernail.

BACKGROUND OF THE INVENTION

For various aesthetic reasons, many individuals wish to possess elongated fingernails or fingernails having a more finished or polished appearance. However, some are unable or unwilling to grow their own natural fingernails out to the desired length. Alternately, they may not have the time, skill, or financial wherewithal to maintain or obtain a more finished appearance that may result from well manicured and/or polished nails. As a result, entire industries have developed around the artificial supplementation and enhancement of natural nails. Such enhancements may range from manicuring and polishing of natural fingernails to individually building artificial nails on the natural nail and nail form from an acrylic powder and liquid which chemically bond to the nail surface as the artificial nail is built. Between these two extremes, are preformed, artificial nails that are glued or otherwise bonded to a person's own naturally occurring fingernails. Such nails are readily available to a wide range of users through drug and department stores. Such preformed artificial nails may be clear or opaque, and/or prepolished and/or decorated to provide the desired appearance.

Artificial nails are commonly made from molded thermoplastic and are available in a wide range of lengths and styles. One broad category of an artificial nail style is the full nail form. As its name implies, the full nail form simulates the entire human fingernail and includes a proximal edge intended to overlay substantially the entire nail bed and a distal free edge which is intended to extend beyond the fingertip of the wearer. The proximal edge is shaped to be disposed substantially adjacent or abut against the cuticle of the finger. The distal free edge may have any of various lengths and shapes, such as oval, square, or flared, depending upon the desired look. Additionally, to further simulate a natural fingernail, the artificial nail is typically formed with a curvature between a first side edge and a second side and a curvature between the proximal and distal edges. Preferably, the artificial nail is sufficiently durable and rigid to withstand the hazards inherent in its use.

Manufacturers typically provide users with a range of nail sizes, e.g., identified by size numbers 0-9, to accommodate most nail sizes. Generally, artificial nails are packaged together in sets including a range of different sizes so that the purchaser receives differently artificial nails for their different fingers. In addition to the set of different sized artificial nails, the package may also include liquid adhesive and/or peel-off adhesive pads for bonding the artificial nails to the purchaser's natural fingernails.

It is well known, however, that the contour of natural fingernails varies greatly between individuals and even between different fingers on the same individual. Variations between the curvatures of the preformed artificial nail and the natural nail, however, may affect the integrity of the attachment to the nail, the comfort to the wearer, and the aesthetic appeal of the nail when secured to the natural nail. For example, some individuals have one or more relatively flat nail beds. When attaching an artificial nail that is more curved than the natural nail bed, there will be a gap between the artificial and natural nail bed. In order to adequately bond the artificial nail to the nail bed, a proportionally greater amount of adhesive must be applied. The best bond, however, is obtained from a thin layer of glue between adjacently disposed artificial and natural nail surfaces. A greater amount of glue may result in the formation of air pockets within the volume of glue, weakening the bond. Consequently, the use of a greater amount of glue may actually result in a less durable bond between the artificial and natural nails, and shorten wear time. Moreover, when the user presses the more arched artificial nail downward against the flatter natural nail bed of the user, and the bond is established, the artificial nail will seek to return to its natural, more arched free position. As a result, this pulling on the natural nail bed can cause the user significant pain and discomfort.

It has been difficult, if not impossible, to produce artificial nails having degrees of curvature between the first and second side edges and proximal and distal edges that accommodate all natural fingernails. While manufacturers may produce a large number of artificial nails with a variety of curves, this solution is undesirable and impractical because of the associated increase in manufacturing costs. As a result, manufactures typically produce a set of preformed artificial nails have varying widths and including set degrees of curvature.

The assignee of the present disclosure has proposed the manufacture and use of an artificial nail that tapers from the distal edge or free edge portion to the proximal edge. In this way, the thinner structure of the nail bed portion of the artificial nail, which is adapted to be disposed along the user's natural nail bed, is relatively flexible, as compared to the free edge portion of the artificial nail, wherein the thicker structure provides greater strength to the artificial nail. The design is disclosed in greater detail in U.S. Publication 2007-0051384A1, which was filed Aug. 16, 2005, and is based upon provisional application 60/601895, filed Aug. 16, 2004.

It has also been proposed to provide a two-part nail including a partial underlay of a deformable material beneath a polymeric body, as disclosed in U.S. Pat. No. 7,150,281. The underlay of deformable material that extends to the proximal edge of or beyond the proximal edge of the stiffer polymeric body to form the proximal end of the artificial nail to be disposed adjacent the user's cuticle.

BRIEF SUMMARY OF THE INVENTION

The invention provides a preformed artificial nail that is designed to allow the artificial nail to flex and conform to the curved shape of a nail bed of a natural fingernail along the nail bed portion, while maintaining the strength and durability of conventional nails. The preformed artificial nail is formed of first and second materials, the first material being comparatively more flexible than the second material. The artificial nail includes a nail bed portion and a free edge portion, the free edge portion being adjacent to and distal the nail bed portion. The free edge portion including an upper portion and a lower portion, the lower portion extending subjacent the upper portion. The nail bed portion has a proximal edge defining the proximal edge of the artificial nail, which is intended to abut against or be disposed substantially adjacent the user's cuticle. The free edge portion has a distal edge defining the distal edge of the artificial nail, which is generally intended to extend beyond the tip of the wearer's natural fingernail. The first material extends substantially from the proximal edge to the distal edge of the artificial nail and forms the nail bed portion and the upper portion of the free edge portion. The second material forms the lower portion of the free edge portion and extends substantially to the distal edge of the artificial nail, the second material being disposed subjacent the first material along the free edge portion.

The disclosure also includes a package including a plurality of such nails, and optionally including adhesive, adhesive pads, an emery board, a manicuring stick, a cleaning pad, an application tool, and/or instruction or product information.

The disclosure additionally includes a method of forming such an artificial nail utilizing a multipart mold wherein one of the nail bed portion and the upper portion of the free edge portion, or the lower portion of the free edge portion is molded in a first cavity formed by first and second mold portions. The second mold portion is then removed and replaced with a third mold portion, and the other of the nail bed portion and the upper portion of the free edge portion, or the lower portion of the free edge portion molded to the component already formed in the mold to create the full nail of the structure described above.

In use, the preformed artificial nail may more closely conforms to the natural nail than traditional single material, single shot nail designs. Accordingly, the arrangement minimizes the chances of formation of air pockets within the layer of glue between the artificial and natural nails. Thus, it may provide a stronger bond between the artificial nail and the natural fingernail, and a reduction in user discomfort. These and other advantages of the invention, as well as additional inventive features, will be apparent from the description of the invention provided herein.

BRIEF DESCRIPTION OF THE DRAWINGS

FIG. 1 is a perspective view of a package of artificial nails constructed in accordance with teachings of the invention.

FIG. 2 is a top plan view of an artificial nail of FIG. 1.

FIG. 3 is a side, cross-sectional view taken along line 3-3 in FIG. 2.

FIG. 4 is a side, cross-sectional view, similar to FIG. 3, of an alternate embodiment an artificial nail constructed in accordance with teachings of the invention.

DETAILED DESCRIPTION OF THE INVENTION

Turning now to the drawings, wherein like reference numbers refer to like elements, there is illustrated in FIG. 1 a nail kit 16 comprising a package 18 containing a plurality 20 of preformed artificial nail assemblies 22, and in FIG. 2, an enlarged plan view of an artificial nail 22 of FIG. 1. Referring to FIG. 2, each artificial nail 22 has a proximal edge 30 and a distal edge 32, the area between the proximal and distal edges 30, 32 generally defining the nail bed portion 34 and the free edge portion 36. The artificial nails 22 further include right and left side edges 37, 38. The length of the artificial nail 22 is defined between the proximal and distal edges 30, 32, while the width of the nail body is defined between the left and right side edges 37, 38.

So that the artificial nail 22 appears natural and appropriately sits upon the wearer's fingernail, the nail 22 is generally formed with a curved or an arched shape between the right and left side edges 37, 38, and a generally less arched contour between the proximal and distal edges 30, 32. The artificial nail 22 includes an upper surface 40 and a lower surface 42. In use, the proximal edge 30 of the artificial nail 22 is adapted to be placed generally adjacent the user's cuticle with lower surface 42 of the nail bed portion 34 being adapted to be placed adjacent the user's natural nail bed. The free edge portion 36 is adapted to typically extend beyond the end of the user's finger with the distal edge 32 generally being disposed at or beyond the end of the user's natural nail when properly placed.

To enable the artificial nail 22 to abut against and generally trace the cuticle, the proximal edge 30 is typically shaped as a rounded curve extending between the left and right side edges 37, 38. In the embodiment illustrated in FIGS. 1 and 2, the distal edge 32, in contrast to the proximal edge 30, is generally squared-off. However, the shape of the distal edge 32 is a function of fashion and the squared-off appearance is only one example of the possible shapes that the distal edge can have. By way of example only, the shape of the distal edge 32 could alternately be rounded, relatively pointed, expanded and/or flattened at along the free edge portion 36.

To bond the artificial nail to the natural fingernail, a liquid adhesive 44 (see FIG. 1) or an adhesive pad (not shown) is typically placed between the lower surface 42 and the nail bed of the natural fingernail while the artificial nail 22 and natural fingernail are pressed together. Preferably, the adhesive or adhesive pad is degradable to permit easy removal of the artificial nail with an appropriate, safe solution. Although not illustrated in this embodiment, the artificial nails 22 may include structure to assist in the application of the artificial nail 22 to a user's natural nail, such as an application tab, for example, which may be similar to that illustrated in U.S. application Ser. No. 11/739,371 filed Apr. 24, 2007, which is likewise assigned to the assignee of this disclosure and incorporated herein by reference, or an alternate design.

The nail kit package 18 typically includes an outer covering 46, here in the form of a box, having at least one transparent portion 48 for viewing the contents of the package 18. The package 18 further includes an inner support housing 50 that generally retains the contents of the package 18 in position within the outer covering 46. The inner support housing 50 is typically formed of a polymeric material, although it may be of an alternate material, such as cardboard. The inner support housing 50 generally includes a plurality of recessed areas 52, and additional contents of the package 18 may be retained in a rear open portion of the inner support housing 50. The package 18 may additionally contain items such as, for example, adhesive 44, a rosewood stick, an application tool, an emery board, instruction or product information, etc. Although all such possibilities are not illustrated in the embodiment shown, it will be appreciated by those of skill in the art that the package 18 may additionally contain these and other materials.

Returning now to FIG. 2 and the structure of the artificial nails 22, in order to provide a more universal fit to user's natural nails, the nail bed portion 34 of the nail 22 is formed of an elastically deformable material 54, while the free edge portion 36 is formed of both the elastically deformable material 54 and a relatively stiffer material 56. The relatively stiffer material 56 is in the form of a lower portion of the free edge portion 36 or an underlayment 58, the elastically deformable material 54 extending along an upper portion of free edge portion 36, the underlayment 58 being disposed subjacent the upper portion along the free edge portion 36. In this way, the elastically deformable material 54 of the nail bed portion 54 may readily conform to the upper surface of the user's natural nail, while the stiffer material 56 of the underlayment 58 provides enhanced rigidity to the free edge portion 34 of the artificial nail 22. Accordingly, the elastically deformable material 54 provides comfort, while the stiffer material 56 provides rigidity similar to the rigidity of the free edge of a natural nail.

Preferably, the elastically deformable material 54 extends along substantially the entire length of the artificial nail 22, that is, from the proximal edge 30 to the distal edge 32 of the nail 22. It will be appreciated, however, that the deformable material 54 need not extend all of the way to the distal edge 32, so long as it extends over at least a portion of the underlayment 58. From an aesthetic standpoint, however, a continuous surface of the elastically deformable material 54 extending along both the nail bed portion 34 and the free edge portion 36 of the artificial nail 22 from the proximal edge 30 to the distal edge 32 provides a smooth upper surface 40, similar to a natural nail. Further, depending upon the opacity of the elastically deformable material 54, the delineation of the underlayment 58 in the artificial nail 22 may additionally simulate the coloring or delineation of a natural nail.

The underlayment 58 may have any appropriate structure. For example, the underlayment 58 may be of a wedge shape, such as it shown in the embodiment of FIG. 3. In the illustrated embodiment, the large end of the wedge shape is shown at the distal edge 32 of the nail 22. In this way, the rigidity of the free edge portion 36 of the nail 22 will gradually increase as it approaches the distal edge 32. Such a structure may further enhance the comfort of the user when the artificial nail 22 is secured to the user's natural nail. It will be appreciated, however, that the underlayment 58 may have an alternate structure. By way of further example, the underlayment 58 may have a relatively uniform cross-section, such as in the underlayment 58 shown in FIG. 4, although an alternate structure may be provided.

As will be appreciated by those of skill in the art, the artificial nail 22 may be formed in any appropriate manner. For example, it may be formed in a multi-part, typically three-part mold assembly. That is, two portions of the mold assembly form a first cavity into which one or the other of the elastically deformable material 54 or the relatively stiffer material 56 is injected, or otherwise transferred to form either the nail bed portion 34 or the free edge portion 36, respectively. With the first formed portion 34 or 36 of the nail 22 remaining in the mold assembly, a portion of the mold assembly is then replaced to form a cavity in the mold assembly adjacent the first formed portion 34 or 36 contained therein. The second material, that is, either the stiffer material 56 or the elastically deformable material 54, is injected or otherwise transferred to form the second portion 36, or 34, respectively, of the nail 22, the two materials bonding together along the joint 54 of the structure describe herein.

While the relatively stiffer material 56 may be any suitable material, it is preferably a thermoplastic material. By way of example only, suitable thermoplastic materials include acrylonitrile butadiene styrene (ABS), polyethylene (PE), polyvinyl chloride (PVC), and polyethylene-terephthalate (PET) and combinations thereof.

The elastically deformable material 54 can be any suitable material that is comparatively more flexible and deformable relative to the relatively stiffer material 56. The deformable material 54 may include such materials as a rubber, silicone, or silicone derivative. Examples of such materials include silicone elastomers, silicone-containing macromers, hydromacromers, TPU (thermo plastic urethane), TPR (thermo plastic rubber), TPE (thermo plastic elastomer), menoprene, and mixtures of the same. Furthermore, the composition of material in the nail body can be consistently uniform throughout or can be comprise generally discrete regions of differing materials or combinations of materials.

In various embodiments, the elastically deformable material 54 and the relatively stiffer material 56 of the nail bed portion 34 and the free edge portion 36 of the artificial nails 22 can be opaque, translucent, or transparent. Additionally, the artificial nails can be provided in various colors and glosses that simulate painted fingernails and may include nail tattoos or charms. Moreover, the artificial nails can be painted in different colors and patterns to simulate decorations, such as strips or flowers. In further embodiments, the artificial nails can be formed with raised protuberances that are shaped to simulate, for example, decorative flowers.

It will thus be appreciated by those of skill in the art that the artificial nail 22 is provided with a degree of flexibility such that the nail bed portion 34 of the preformed artificial nail may be flattened or more arched as it is applied to the user's natural nail such that the artificial nail 22 more closely conforms to the user's natural finger nail. More specifically, inasmuch as the nail bed portion 34 more flexible than the free edge portion 36, the nail bed portion 34 may be "flattened" to conform to the natural shape of a flatter nail bed. When pressed against the nail bed of a flatter natural fingernail, the portions of the right and left side edges 37, 38 extending along the nail bed portion 34 contact the natural nail bed first and are deflected apart until the lower surface 42 of the nail bed portion 34 lies adjacent the natural fingernail. Conversely, when pressed against the nail bed of a more arched natural fingernail, the portions of the right and left side edges 37, 38 of the nail bed portion 34 may be manually arched downward to contact the user's natural nail bed until the lower surface 42 of the nail bed portion 34 conforms to the nail bed of the natural fingernail. Thus, even if the degree of curvature formed into the nail bed portion 34 during molding is greater or less than the degree of curvature of a natural fingernail, the artificial nail 22 may still be utilized in that it may be conformed to the natural nail bed in placement.

By conforming the nail bed portion 34 to provide substantially full contact the natural nail bed, a stronger bond between the artificial nail 22 and natural fingernail is produced. Specifically, where liquid adhesive or adhesive pads are used to bond the artificial nail 22 to the natural fingernail, the adhesive bond between the lower surface 42 and the natural fingernail will have a more uniform profile along the curvature of the natural fingernail. Additionally, because of the added flexibility of the deformable material of the nail bed portion 34, the nail 22 will have less of a tendency to separate itself from the natural fingernail due to the resilient forces of the flexible material, and will provide the user a more comfortable fit than conventionally molded, single material artificial nails. This is especially advantageous during application when the artificial nail 22 has been pressed adjacent to the natural fingernail, but the applied adhesive or adhesive pad has yet to completely cure. Furthermore, conforming the shape of the nail bed portion 34 to the natural nail bed provides a more natural appearing and aesthetically pleasing joinder between the two.

Inasmuch as the free edge portion 36 of the artificial nail 22 is more rigid than the deformable nail bed portion 34, the free edge portion 36 of the artificial nail 22 intended to extend beyond the natural finger nail free edge portion is provided with added strength. Hence, the artificial nail 22 is more resistant to deformation due to impact with external objects. Accordingly, the artificial nail 22 provides enhanced durability and comfort over traditional artificial nails.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a preformed artificial nail adapted to substantially cover an upper surface of a user's natural nail, the upper surface of the natural nail extending from a cuticle and having an oppositely disposed free edge and a natural nail bed attached at the user's finger, the artificial nail having upper and lower surfaces and comprising a nail bed portion having a proximal edge defining a proximal edge of the artificial nail and a free edge portion having a distal edge defining the distal edge of the artificial nail, the free edge portion being adjacent to and distal the nail bed portion, each of the nail bed portion and the free edge portion having opposite side edges, said artificial nail being formed of a first material and a second material, the first material extending substantially from the proximal edge to the distal edge of the artificial nail and forming the nail bed portion, the second material extending along the free edge portion substantially to the distal edge of the artificial nail, the second material being disposed subjacent the first material along the free edge portion, the method comprising:
providing first and second mold portions presenting at least a first cavity for forming the nail bed portion and an upper portion of the free edge portion of the artificial nail, the second mold portion including a wall for forming an interface between the upper and lower portions of the free edge portions of the artificial nail, the wall extending substantially longitudinally relative to an artificial nail to be formed, introducing a first material into the first cavity to form the nail bed portion and the upper portion of the free edge portion of the artificial nail, removing the second mold portion from the first mold portion, providing a third mold portion in cooperation with the first mold portion, the first and third mold portions containing the first material forming the nail bed portion and upper the portion of the free edge portion of the artificial nail, and at least a second cavity to form the lower portion of the free edge portion of the artificial nail, and introducing a second material into the second cavity to form the portion of the lower free edge portion of the artificial nail, the lower free edge portion being disposed subjacent the upper portion of the free edge portion of the artificial nail, the material from which the nail bed portion and the upper portion of the free edge portion of the artificial nail is formed being comparatively more flexible than the material from which the lower portion of the free edge portion of the artificial nail is formed.

2. The method of claim 1 wherein the lower portion of the free edge portion has a substantially uniform thickness.

3. The method of claim 1 wherein the lower portion of the free edge portion has a thickness that substantially increases from a proximal edge of the free edge portion to the distal edge of the free portion.

4. A method of forming a preformed artificial nail adapted to substantially cover, flex and conform to an upper surface of a user's natural nail, the upper surface of the natural nail extending from a cuticle and having an oppositely disposed free edge and a natural nail bed attached at the user's finger, the artificial nail comprising an upper surface, a lower surface having a uniform profile along the curvature of the natural nail wherein at least a portion of the lower surface is adapted to be placed adjacent the upper surface of the user's natural nail, a proximal edge adapted to be placed substantially adjacent the user's cuticle, a distal edge opposite the proximal edge, a right edge, a left edge opposite the right edge, a nail bed portion having a proximal edge defining a proximal edge of the artificial nail and a free edge portion having a distal edge defining the distal edge of the artificial nail, the free edge portion being adjacent to and distal the nail bed portion, the free edge portion including an upper portion and a lower portion, the lower portion extending subjacent the upper portion, said artificial nail being formed of a first material and a second material, the first material being comparatively more flexible than the second material, the first material extending from the proximal edge and forming the nail bed portion and the upper portion of at least a portion of the free edge portion, the second material forming at least a portion of the lower portion of the free edge portion, the second material being disposed subjacent the first material along the free edge portion, wherein the lower portion of the free edge portion has a thickness that substantially increases from a proximal edge of the free edge portion to the distal edge of the free edge portion such that the rigidity of the free edge portion of the nail gradually increases as it approaches the distal edge, the method comprising:

providing first and second mold portions presenting at least a first cavity for forming the nail bed portion and an upper portion of the free edge portion of the artificial nail, the second mold portion including a wall for forming an interface between the upper and lower portions of the free edge portions of the artificial nail, the wall extending substantially longitudinally relative to an artificial nail to be formed, introducing a first material into the first cavity to form the nail bed portion and the upper portion of the free edge portion of the artificial nail, removing the second mold portion from the first mold portion, providing a third mold portion in cooperation with the first mold portion, the first and third mold portions containing the first material forming the nail bed portion and upper the portion of the free edge portion of the artificial nail, and at least a second cavity to form the other of the lower portion of the free edge portion of the artificial nail, and introducing a second material into the second cavity to form the portion of the lower free edge portion of the artificial nail, the lower free edge portion being disposed subjacent the upper portion of the free edge portion of the artificial nail, the material from which the nail bed portion and the upper portion of the free edge portion of the artificial nail is formed being comparatively more flexible than the material from which the lower portion of the free edge portion of the artificial nail is formed.

5. The method of claim 4 wherein the lower portion of the free edge portion has a wedge shape.

6. The method of claim 1, further comprising forming a proximal edge of the lower free edge portion closer to the distal edge of the artificial nail than the proximal edge of the artificial nail.

7. The method of claim 4, further comprising forming a proximal edge of the lower free edge portion closer to the distal edge of the artificial nail than the proximal edge of the artificial nail.

* * * * *